United States Patent Office

3,047,603
Patented July 31, 1962

3,047,603
ALLYLIC ESTERS AND THE PRODUCTION THEREOF
George Sosnovsky, Chicago, Ill., assignor to Armour Research Foundation of Illinois Institute of Technology, Chicago, Ill., a not-for-profit corporation of Illinois
No Drawing. Filed July 1, 1960, Ser. No. 40,142
3 Claims. (Cl. 260—448.2)

The present invention relates to the production of allylic esters containing silicon, and more particularly to the production thereof from allylsilanes.

I have discovered that allylsilanes of the general formula $(R)_3Si-CH_2-CH=CH_2$ readily react with peresters in the presence of copper ion to form an allylic ester. Thus:

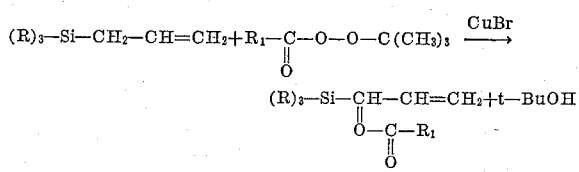

The allylic esters which result from such process are characterized by the formula

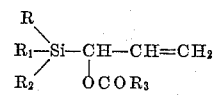

wherein R, R¹, R², and R³ are alkyl or aryl groups. Such esters are useful in conjunction with various coatings and plastic materials.

Accordingly, a primary object of my invention is to provide a novel class of compounds comprising allylic esters having silicon contained therein.

Another object of my invention is to provide a method of making such allylic esters which comprises reacting allylsilanes with peresters in the presence of copper ion.

A more specific object of my invention is to provide a method of making allylic esters which comprises reacting allylsilanes with t-butyl peresters in the presence of copper ion.

Other objects, features and advantages of my invention will become apparent to those skilled in this particular art from the following detailed disclosure thereof.

In carrying out the present process of forming allylic esters and an alcohol sideproduct, a number of chemical events occur simultaneously. Specifically, the perester splits at its oxygen-oxygen linkage to yield the two radicals

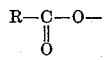

and R—O—. At the same time, one alpha hydrogen of the allylsilane is split off to leave $(R)_3-Si-CH-CH=CH_2$ To this alpha carbon is then joined the acyloxy radical; thus

forming the allylic ester. The alpha hydrogen takes part in the formation of an alcohol:

R—O—+H→R—OH

Particularly good results are obtained with tertiary butyl peresters; for example, t-butyl perbenzoate and t-butyl peracetate. With such peresters, in addition to the allylic ester, there is also produced t-butyl alcohol. Thus:

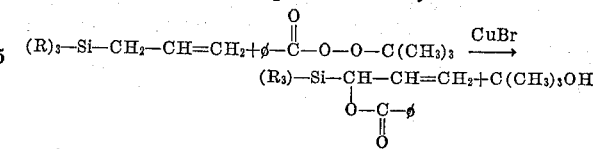

and

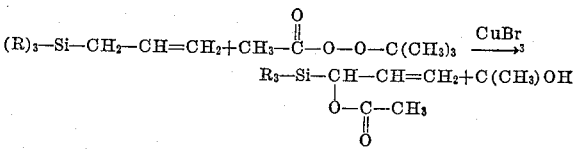

My invention may be more fully understood by reference to a specific example thereof:

EXAMPLE

*Preparation of 3-Benzoyloxy-3-Trimethylsilylpropene-1*

To a boiling mixture of trimethylallylsilane (0.225 mole) and cuprous bromide (0.35 millimole) was added tertiary-butyl perbenzoate (0.15 mole) over a period of two hours. The reaction mixture was then heated at reflux for another 18 hours. From a structural standpoint the following reaction occurred:

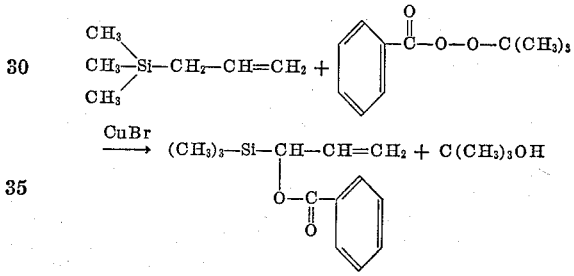

The reaction mixture was then cooled to room temperature, diluted with 50 ml. ether and extracted with 2 N sodium carbonate solution to remove benzoic acid (25%). The remaining ethereal solution was washed with water, dried with sodium sulfate and concentrated on a steam bath. The oil which was then left was distilled at reduced pressure. I obtained 16.5 grams of 3-benzoyloxy-3-trimethylsilylpropene-1, representing a 47% yield. Such compound is characterized as follows:

Boiling point: 80–83° C. at 0.2 mm. Hg.
$n_D^{25} = 1.5010$.
Analytical calculation as $C_{13}H_{18}O_2Si$:

|  | Calculated | Found |
|---|---|---|
| C | 66.62 | 67.01 |
| H | 7.74 | 7.91 |
| Mol. Wt. | 234 | 240 |

Infrared bands.

1730 cm.⁻¹ (carbonyl)
985, 915 (terminal olefin)
750, 700 (phenyl)

It will be understood that modifications and variations may be effected without departing from the spirit or scope of the novel concepts of my invention.

I claim as my invention:
1. An allylic ester of the formula

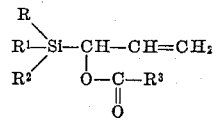

wherein R, R¹, R², and R³ are selected from the group consisting of alkyl and aryl.

2. 3-benzoyloxy-3-trimethylsilylpropene-1.

3. The method of producing 3-benzoyloxy-3-trimethylsilylpropene-1 which comprises the steps of reacting trimethylallylsilane with tertiary butyl perbenzoate in the presence of cuprous bromide and separating the reaction products.

References Cited in the file of this patent

UNITED STATES PATENTS 2,582,568   Speier _____ Jan. 15, 1952

OTHER REFERENCES

Mikulasova et al.: Chemical Abstracts, vol. 52 (1958), columns 9028 and 9950.